(12) United States Patent
Reichenbach

(10) Patent No.: US 11,477,987 B2
(45) Date of Patent: Oct. 25, 2022

(54) METHOD FOR CONDITIONING A FOOD

(71) Applicants: Albert Reichenbach, Iserlohn (DE); Klaus Loesche, Bremerhaven (DE)

(72) Inventor: Albert Reichenbach, Iserlohn (DE)

(73) Assignee: Klaus Loesche, Bremerhaven (DE)

( * ) Notice: Subject to any disclaimer, the term of this patent is extended or adjusted under 35 U.S.C. 154(b) by 378 days.

(21) Appl. No.: 16/342,471

(22) PCT Filed: Oct. 17, 2017

(86) PCT No.: PCT/EP2017/076489
§ 371 (c)(1),
(2) Date: Apr. 16, 2019

(87) PCT Pub. No.: WO2018/073257
PCT Pub. Date: Apr. 26, 2018

(65) Prior Publication Data
US 2019/0246654 A1     Aug. 15, 2019

(30) Foreign Application Priority Data
Oct. 18, 2016    (DE) .......................... 102016119795.5

(51) Int. Cl.
*A21D 15/02*     (2006.01)
*A21D 15/08*     (2006.01)
(Continued)

(52) U.S. Cl.
CPC ............. *A21D 15/02* (2013.01); *A21D 15/08* (2013.01); *A23L 3/36* (2013.01); *A23L 3/365* (2013.01); *A23L 3/37* (2013.01); *A23V 2002/00* (2013.01)

(58) Field of Classification Search
CPC ........ A21D 15/02; A21D 15/00; A21D 15/04; A21D 17/004; A21D 17/008; A23L 3/361;
(Continued)

(56) References Cited

U.S. PATENT DOCUMENTS

| 2004/0066835 A1 | 4/2004 | Drews |
| 2007/0166444 A1 | 7/2007 | Narumiya et al. |
| 2009/0260780 A1 | 10/2009 | Katori et al. |

FOREIGN PATENT DOCUMENTS

| DE | 2902270 A1 | 7/1980 |
| DE | 202010015209 | 3/2011 |

(Continued)

OTHER PUBLICATIONS

International Search Report dated Apr. 26, 2018 in parent International application PCT/EP2017/076489.
(Continued)

*Primary Examiner* — Erik Kashnikow
*Assistant Examiner* — Lela S. Williams
(74) *Attorney, Agent, or Firm* — Polson Intellectual Property Law, PC; Margaret Polson; Christopher Sylvain

(57) ABSTRACT

A method for conditioning a food in connection with a treatment, a processing, or the production of the food in an air environment in an open conditioning space, whereby a) climatic data influencing the food in the conditioning process are captured during the conditioning process in the surroundings of the food within the conditioning space, wherein, as climatic data, the conditioning variables of temperature, absolute water content and air pressure are captured as measured values and are compared with food-related setpoint values for the temperature change process, and b) if a deviation of the measured value from the setpoint value associated therewith is detected, the surroundings of the food in the conditioning space are influenced in order to adjust the measured value to the setpoint value.

9 Claims, 2 Drawing Sheets

Figure 1:
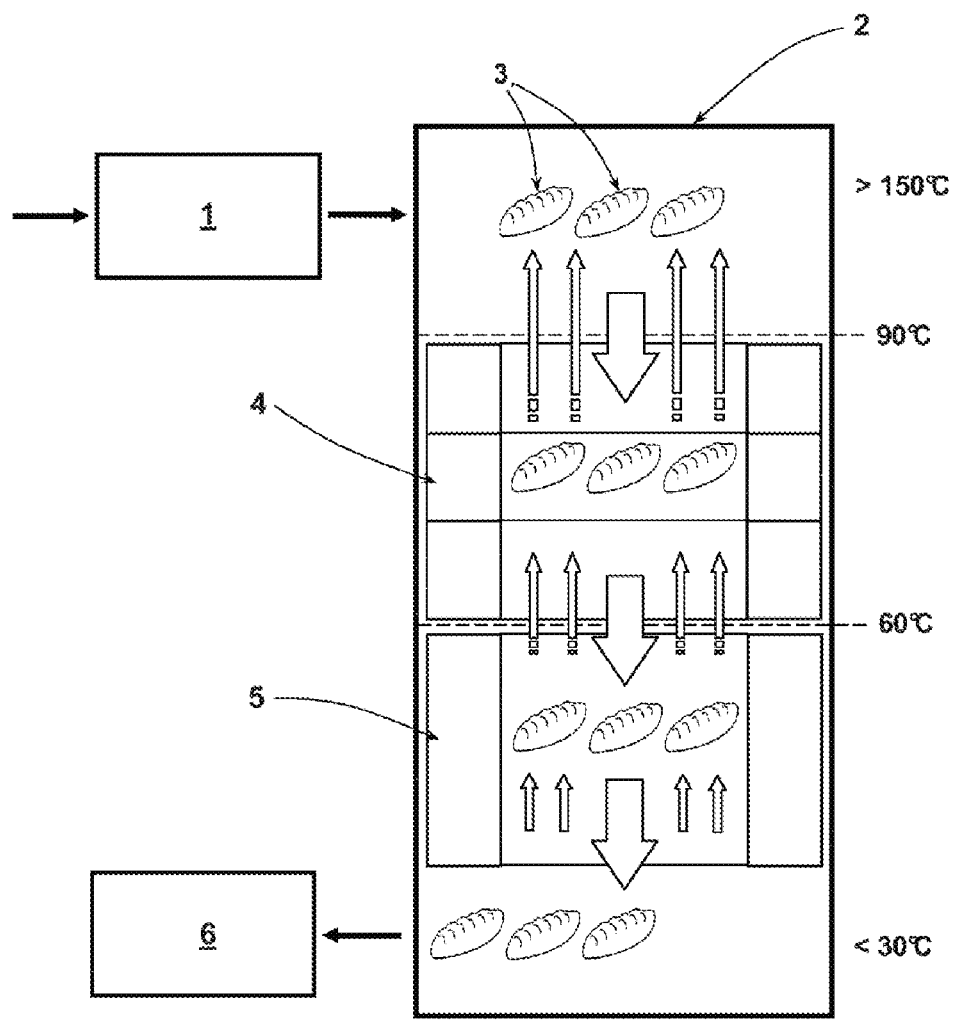
Figure 2:
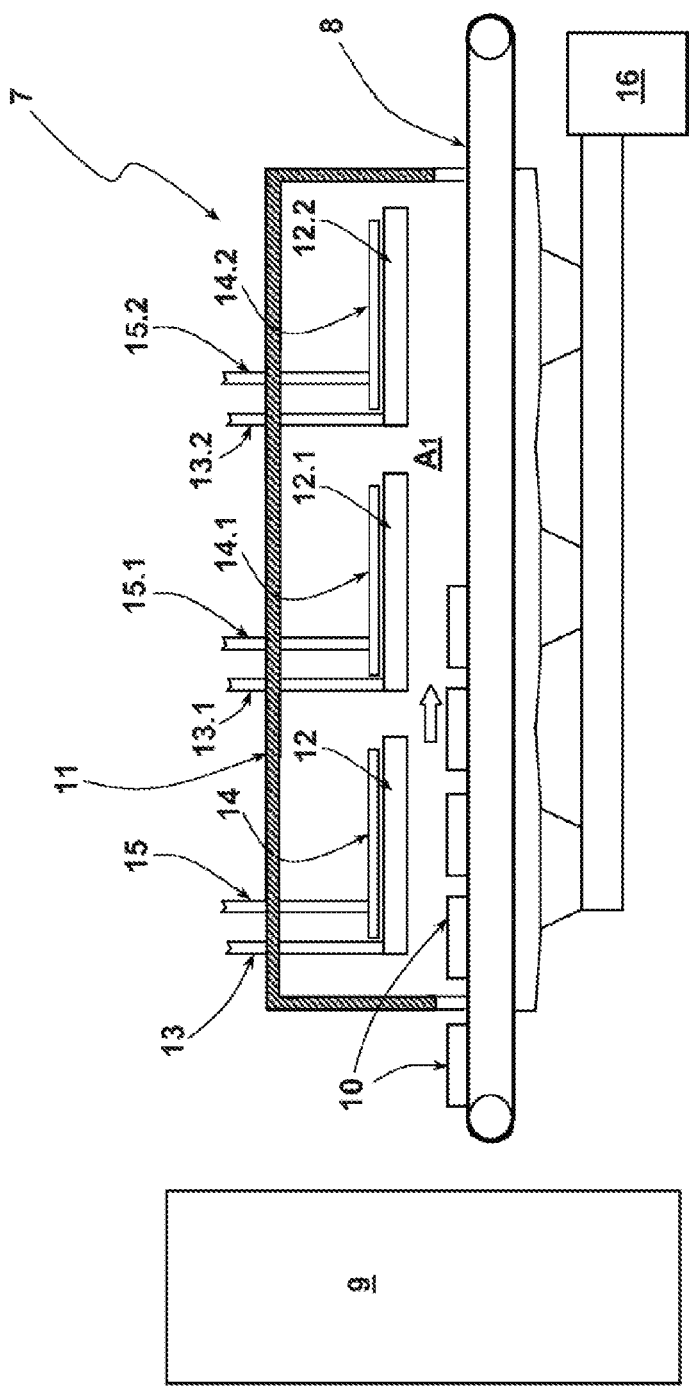

(51) Int. Cl.
    *A23L 3/36* (2006.01)
    *A23L 3/365* (2006.01)
    *A23L 3/37* (2006.01)

(58) Field of Classification Search
    CPC ... A23L 3/36; A23L 3/365; A23L 3/37; A23B 4/07
    See application file for complete search history.

(56) References Cited

FOREIGN PATENT DOCUMENTS

| | | |
|---|---|---|
| DE | 202010015609 U1 | 2/2012 |
| DE | 102015115324 B3 | 10/2016 |
| DE | 102016102764 A1 | 8/2017 |
| EP | 2614729 A1 | 7/2013 |
| EP | 2839753 A1 | 2/2015 |
| JP | H09275955 A | 10/1997 |
| WO | WO-2014187483 A1 * 11/2014 | ............... A23B 4/07 |

OTHER PUBLICATIONS

International Preliminary Report on Patentability, Chapter II, dated Apr. 18, 2019 in parent International application PCT/EP2017/076489.

Office Action dated May 28, 2019 in related German application 102016102764.2.

* cited by examiner

METHOD FOR CONDITIONING A FOOD

BACKGROUND

The present disclosure relates to a method for conditioning a food in conjunction with a treatment, a processing, or the production of the food in an air environment in an open conditioning space.

Baked products, such as bread, rolls and the like, must cool down after being removed from the oven provided for baking before they are subjected to further treatment. Such a subsequent treatment may for example be slicing bread or packaging or freezing the cooled down baked products. The cooling down process after the actual baking in the production of baked products is not an uncritical step, primarily because it passes through temperature ranges in which recontamination of the baked products can occur. Recontamination means those processes through which such baked product is exposed to the ambient air while cooling down and microbial germs in the ambient air can settle on the surface of the cooling baking piece. The cooling down rate of baked products removed from an oven depends on the condition of the baked products, wherein the cooling down of baked products having a large mass and a relatively high specific weight takes respectively longer at room temperature. For wholemeal bread, if cooling down at room temperature from a core temperature of about 90° C. to a slicing temperature, i.e. a core temperature of about 24° C., a cooling down time of about 8 hours and longer can be expected. The cooling time may be 12-24 hours and longer for great bread weights.

Humidifiers are used when using refrigeration facilities to accelerate cooling down of baked products to prevent a larger moisture loss while the baked products removed from an oven are cooling down. Steam generators are used for this purpose. Humidifying the air by steam during the cooling down phase may counteract a high moisture loss in the baked product. But care must be taken that no condensates form which can exert an adverse physical and hygienic influence on the baked product.

Defrosting deep-frozen foods, particularly at a food processing plant, is not without problems if the structure, optical appearance, and taste of the frozen food must be maintained. Maintaining a changed structure of a deep-frozen food after defrosting requires freezing as intended. The freezing rate and thus the freezing time have a critical influence on maintaining the original food structure during freezing. Freezing rate and time depend on the ambient temperature, among other factors. As a rule, the quality of the food after defrosting is better if it has been cooled down from the ambient temperature to the deep-freeze temperature in a short time. A food processing plant is typically able to ensure this easily.

Defrosting a deep-frozen food is more problematic, since this process cannot typically be performed at the rate that is possible for freezing. Finally, the food to be defrosted, which naturally defrosts from the outside to the inside, is not intended to be fully or partially cooked on the outside. Therefore, frozen foods are defrosted in an environment which sometimes is only a few degrees above zero. But this requires relatively long defrosting times. Long defrosting times entail the problem, however, that these foods are exposed more or less uncontrolled to their surroundings during the defrosting process and may therefore be microbially, e.g. bacterially or fungally, contaminated. This is possible at temperatures as low as −8° C. to −10° C.

Ambient conditions such as temperature and pressure have an impact on the later quality of the food in conjunction with the production of the food as well. This is the case, for example, when fermenting dough for producing baked products. A temperature increase during fermenting lets the fermentation process run faster, which may sometimes be undesirable. The dough must be refrigerated for this reason. Refrigeration however poses the risk of condensate formation, which is primarily undesirable with respect to a risk of contamination.

A rotisserie grilling device with an integrated sensor system is known from DE 20 2010 015 609 U1. In this prior art grilling device, the cooking chamber represents the conditioning space. It is closed. A circulating fan is used to produce a circulating air flow in the cooking chamber. An electrically or gas-heated heat exchanger provides the required temperature which is conveyed by the air flow from the heat exchanger to the food to be grilled in the grill area. It is a particularity of this prior art grilling device that the air flow does not just flow onto the food to be grilled, which is on spits, from outside but also from inside via respective air-circulating ducts. While this prior art discloses capturing the humidity and flow rate within the cooking chamber, controlling these variables is not envisaged.

The above explanations demonstrate that conditioning foods is useful and necessary for different production-related temperature changes to maintain the quality of a food as best as possible following the temperature change. A particular challenge in this respect is conditioning the foods in a conditioning space which is not tightly sealed.

The foregoing example of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and depicted in conjunction with systems, tool and methods which are meant to be illustrative, not limiting in scope. In various embodiments, one or more of the above described problems have been reduced or eliminated, while other embodiments are directed to other improvements.

Proceeding from this background, an aspect of the present disclosure is to provide a method for conditioning a food, in conjunction with a production-related process step, involving a temperature change in an air environment, which not just enables effective and low-energy conditioning but allows performing the conditioning of foods in an open conditioning space, for example if a continuous cooling system is present.

This is achieved by a method of the type mentioned at the outset, in which a) climatic data influencing the food in the conditioning process are captured during the conditioning process in the surroundings of the food within the conditioning space, wherein, as climatic data, the conditioning variables of temperature, absolute water content, and air pressure are captured as measured values and are compared with food-related setpoint values for the temperature change process, and b) if a deviation of the measured value from the setpoint value associated therewith is detected, the surroundings of the food in the conditioning space are influenced in order to adjust the measured value to the setpoint value, wherein, for the purpose of this influencing, an air flow is applied to the food in the conditioning space, and (i) influencing is performed in relation to an adjustment of the measured temperature to the setpoint temperature via the supplied air amount and/or the temperature of the supplied air flow, (ii) influencing is performed with respect to an adjustment of the measured pressure to the setpoint pressure via the supplied air amount, and (iii) influencing is performed with respect to an adjustment of the absolute measured water content to the absolute setpoint water content via a corresponding aerosol load of the air flow.

In this conditioning method, various climatic conditioning variables are captured for conditioning the food within the open conditioning space. Variables captured are temperature, absolute water content, and air pressure within the conditioning space, preferably near the foods to be conditioned. If desired, other conditioning variables can be captured, such as air movements triggered, for example, by a draft, convection, or the like. Setpoint values were predetermined for the food-relevant conditioning variables temperature, relative humidity, and air pressure, which should be present at a specific temperature or in a specified temperature range during the temperature change process. The relative humidity, which is equivalent to the water activity of the food, is captured via the conditioning variable of absolute water content. The absolute water content in the surroundings of the food is in a defined relationship with its relative humidity, which again is temperature-dependent. The setpoint values are predetermined such that the food has the desired properties/quality characteristics in the conditioning process step. This can be a process of cooling down, for example of baked products removed from an oven, defrosting of deep-frozen foods, or maintaining a constant climatic environment or a changing climatic environment. In the case of a temperature change, the setpoint values change as a function of the temperature change of the food. When the temperature rises, relative humidity, for example, changes as well, which can be compensated by providing respective setpoint values. When detecting a setpoint value shift of a conditioning variable, the surroundings of the food in the conditioning space are influenced accordingly to harmonize the current measured value of a conditioning variable with the specified setpoint value.

It is a specialty of the disclosed subject matter that two actuators are used to influence the conditioning variables temperature, absolute water content derived from the relative humidity, and air pressure. The one actuator is an air flow which flows onto the food in the conditioning space. By exerting a respective influence, the air temperature and the air pressure can be influenced using the air flow in the conditioning space. The temperature can be influenced by controlling the temperature of the supplied air flow accordingly. The air pressure is influenced via the amount of air supplied. An aerosol generator for generating aerosol with which the air flow is loaded is used as the second actuator for influencing the climate in the surroundings of the food in the conditioning space. The aerosol is then carried by the air flow into the surroundings of the food. In this manner, the absolute water content in the conditioning space and thus in the immediate surroundings of the food can be influenced. The air flow is used as the carrier of the aerosol whose droplets are small enough to be carried along in the air flow as a floating load. It is advantageous if the air flow is introduced into the air flow only inside the conditioning space or when it enters the conditioning space. In addition to a change of the absolute water content in the surroundings of the food and thus the relative humidity on the surface of the food, the aerosol supports the cooling process adiabatically, such as when cooling down baked products after their removal from an oven. The temperature in the conditioning space can also be influenced by controlling the aerosol temperature accordingly. The use of aerosol has the special advantage that no heat source must be used for its generation, which differs from using steam. It is also not typically necessary to use a refrigeration unit. Therefore, smallest aerosol fluid droplets can be supplied at the desired temperature without having to consider condensation processes related to temperature drops, which is the case when using steam.

The aerosol load of the air flow can be used to bind dust particles. In a bakery, this dust can be particulate matter or flour dust. Binding dust improves the air conditions in the area through which the air flow borne aerosol flows. Since dust can carry microorganisms, particularly mold spores, this prevents contamination of foods such as baked products.

The air pressure can be influenced to increase it. Increased air pressure minimizes the steam partial pressure from a baked product, which can further lengthen the time the baked product stays fresh. Similarly, entry of microorganisms such as mold spores is avoided in this manner.

Since an air flow is used for influencing the climate within the conditioning space, the previously described conditioning method is suitable for conditioning foods in an open conditioning space through which the foods are conveyed using, for example, a continuous conveyor, such as a conveyor belt. Air (temperature) exiting from the conditioning space is compensated by the inflow and the described control of the climatic surroundings of the food.

The setpoint values can be the result of test series on the foods. According to one embodiment, the water activity of the food is included in the setpoint values. The aforementioned climatic variables temperature, absolute water content, and air pressure influence the water activity in a temperature change process. Therefore, the ambient climate of the foods can be described particularly well and sufficiently based on these values. This is also remarkable when considering that a change in one of the above-mentioned variables can result in undesirable changes in the quality of the food, even if the other variables remain constant. For example, the capacity to absorb water as well as desorption and absorption processes in the food change depending on temperature. The water activity values of foods are known for different temperatures. Therefore, water activity is particularly suited for determining the setpoint values for the climate in the surroundings of the food in the conditioning space based thereon and on the temperature change to be performed.

Setting the relative humidity through a larger or smaller aerosol load additionally has the advantage that the aerosol can be used as a carrier for antimicrobial and/or antifungal substances, if these are intended to be introduced into the conditioning space. Biological substances are used as such substances. These are not destroyed when providing aerosol rather than steam because the water does not need to be heated for steam generation. If the aerosol must be sterile, it can be sterilized using electromagnetic radiation, for example by UV radiation. This process can be coupled with the process of aerosol generation. It is also an option to perform such sterilization a short time before the aerosol enters the air flow.

Instead of electromagnetic methods for providing sterile aerosol, another option is to produce cold plasma by ionization of air, which results in plasma cluster formation in microorganisms and kills them. Cold plasma can be added to the air flow. Such an air flow is not just sterile, is also has a sterilizing effect. This measure will kill, for example, bacteria, yeasts, and mold fungi. The prescribed options of supplying sterile aerosol or cold plasma by ionization of the air flow can be used when treating foods at room temperature, both for cooling down and defrosting.

The climate inside the conditioning space can be influenced by the air flow in a short time, virtually spontaneously, both with respect to a desired temperature change, a change of the flow rate, or of the aerosol load of the flow. This does not only require rapid adjustment of the measured value to a setpoint value when a setpoint value shift is detected; it also allows very precise control of these conditioning variables, either for keeping climatic surroundings of the food constant or for temperature change processes over the entire duration of the conditioning process. Therefore, this method for improving the setting of the desired food quality is also suitable for including climatic data that are present outside the building in which the conditioning space is located into the closed-loop control process. Such influence can be exerted proactively, where required, to prevent greater setpoint value shifts inside the conditioning space. Such setpoint value shifts may be air pressure related, for example. If the absolute water content, the temperature and/or air pressure change rapidly, for example due to a weather change outside the building, this will become noticeable with a specific delay in an open conditioning space. To avoid having to control a greater setpoint value shift detected in the conditioning space spontaneously across its entire magnitude, which may result in over- and undershooting, timely changing the control variable of at least one of the actuators allows an early response to an expected setpoint value shift. For such influencing, the time it takes for a climatic change detected outside the conditioning space to become noticeable in the conditioning space is taken into consideration. As a result, climatic changes occurring outside the conditioning space will not adversely impact the quality of the food subjected to conditioning. This means that high food quality can be ensured even for production-related temperature change processes, even if climatic conditions in the surroundings of the conditioning space change rapidly.

This method can also be used to anticipate regularly recurring climatic changes outside the conditioning space, such as the temperature gradient over a day, which also involves changes of the dew point, the absolute water content in the ambient air. This applies accordingly to seasonal changes in these climatic variables.

Similarly, this method can be used to compensate influences on the air flow, which become noticeable in the conditioning space, for example by convection or a draft in the building, without having to accept a decline in quality of the food.

In addition to the climatic data already described, this conditioning method can also be used to monitor and control gas percentages or gas concentrations in the surroundings of the food. For example, the $CO_2$ content and/or the $O_2$ content in the surroundings of the food can be monitored. Monitoring and controlling the $CO_2$ content and/or the $O_2$ content in the surroundings of a food during its conditioning is often favorable, for example when producing dough for baked products or in conjunction with operating other fermenting facilities. In the production of dough, a specific oxygen content in the ambient air is needed during fermentation to maintain a specific dough quality. Gases which occur during the fermentation process, such as carbon dioxide or ethanol, dilute and thus reduce the oxygen content in the surroundings of the food accordingly. To avoid reducing the fermenting power of the yeast in the fermentation process to a point where fermentation is inhibited, a specific minimum oxygen content is required in the surroundings of the dough. Oxygen is also needed for the formation of aroma-active substances during fermentation. In addition, dough rheology and the volume of baked products produced from the dough can be favorably influenced by a minimum oxygen content. Wheat doughs in particular are oxidatively stabilized. For this reason, and for ensuring the required air quality for people working in production, the content of specific gases, e.g. the $O_2$ content and/or the $CO_2$ content and/or the ethylene concentration in the open conditioning space are monitored using respective sensors in one embodiment of the method. Typically, the concentrations of the two gases $CO_2$ and $O_2$ are monitored. The measured gas content values captured are compared to the specified setpoint values for $CO_2$ and $O_2$ contents. When detecting a deviation that requires correction, oxygen-richer supply air is fed into the conditioning space via the air flow provided for conditioning, optionally in combination with an increase in the amount of air supplied. This action increases a low oxygen content. At the same time, it reduces the $CO_2$ content. According to one embodiment of the method, the oxygen-richer supply air is provided by supplying ambient air from outside the building in which the conditioning space is located. This can be achieved by opening or enlarging an already open building opening, for example a ventilation flap or the like.

The fermentation process and thus the quality of dough and baked products can be optimized via the oxygen content in the surroundings. It is assumed that it is stated for the first time herein that it is advantageous to monitor the oxygen content in fermentation spaces with respect to the flow of the fermentation process. Fermentation can be accelerated and the formation of aroma and flavoring substances in the baked products can be improved at a specific oxygen content. In addition, the oxygen content also influences dough stability for improved handling of the dough pieces, for example with respect to an improved baking volume or increased freezing/defrosting resistance.

In fruit, the ethylene concentration can be monitored, for example, which also must not exceed specific values. When treating raw meat as a food, the presence of a higher oxygen content is advantageous because it will keep its red color for a longer time.

It is assumed that the connection between the quality of a dough and the $O_2$ and $CO_2$ concentration in the surroundings of the dough have for the first time been identified as quality-influencing factors for dough production and the baked products to be produced therefrom. In one embodiment, the concentrations of these gases are therefore to be monitored and controlled with respect to a predetermined level.

Alternatively, or in addition to monitoring the $CO_2$ and $O_2$ concentrations in the ambient atmosphere of the food (ambient air), the concentrations of other gases may be monitored. If the conditioning process is for example performed in an inert gas atmosphere, e.g. in a nitrogen environment, the concentration of this gas can be monitored and controlled.

The concentrations of specific gases, e.g. the oxygen content, can also be monitored in conjunction with conditioning foods as part of a defrosting process. Sometimes the oxygen content in a defrosting atmosphere must not exceed a specific value to prevent oxidation processes during defrosting.

The method described above is suitable for different processes. For the treatment, processing and/or production of foods. This includes, for example, the cooling down of heated, baked foods or the defrosting of deep-frozen foods as well as keeping the ambient climate constant or changing the ambient climate over a process period, as is desired, for example, for the fermentation of dough.

The described method is also particularly suited for temperature change processes in which the temperature change is performed in two or more steps and different climatic conditions are desired in the food environment in each step.

The control process described above can be performed using per se known control algorithms. In many cases, the individual steps will be connected in such a case, such that exhaust air from a first step flows into the second step (or vice versa). Since the air flow and aerosol supplied to each step can be set independently, the desired climate in the surroundings of the food can be set and the control process can be maintained in such a case.

The conditioning space can essentially be any space. The conditioning space can for example be an area of a building, without any further spatial partitioning. It is also possible that the conditioning space is a run-through tunnel, as described above. Such a conditioning space may well be a closed space. Multiple conditioning spaces may be arranged in one building and may well be in an operative connection with respect to setting and maintaining the respective desired climatic surroundings of the foods.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure will be explained below with reference to illustrated embodiments. Wherein:

FIG. 1: shows a block diagram for explaining a method for cooling down baked products after their removal from an oven, and FIG. 2: is a schematic view of a defrosting plant for performing a method according to the present disclosure.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

First Depicted Embodiment

The baking pieces are baked in a continuous oven 1 and removed as baked products from the oven 1 upon completion of the baking process. This can be a continuous process or a batch process. The baked products removed from the oven 1 are placed in a refrigeration unit, which in the embodiment of FIG. 1 is implemented as a cooling tower 2.

The cooling tower 2 represents a conditioning space in this embodiment. Baked products are conveyed from the top to the bottom in the cooling tower 2, as indicated by the downward block arrows in FIG. 1. The conveying path can either be vertical, as shown schematically in FIG. 1, or in a spiral or another conveying route on which the baked products are conveyed from the top plane to the bottom plane. The baked products are typically conveyed via a conveying spiral in the direction mentioned, at a gradient between 7% and 10%. Setting up a gradient of 8% has proved useful.

The baked products, in the figure schematically shown as breads 3 which were baked at an oven temperature of more than 160° C., emit heat and steam. This alone creates an updraft in the cooling tower 2, as indicated by the upward block arrows. When the breads 3 have been conveyed along a certain path against this flow direction in the cooling tower 2, they enter a temperature zone in which an aerosol treatment starts. An upper aerosol treatment temperature starts at a 90° C.-95° C. core temperature of the baked products in the embodiment shown. The upper aerosol treatment temperature is below 100° C. in any case. From this height in the cooling tower 2, there is an air and aerosol supply 4 with which aerosol borne by air is introduced into the cooling tower 2 at a temperature of about 25° C. to act on the breads 3 to be cooled down. Air and aerosol are supplied peripherally in this cooling path of the cooling tower 2. The air-borne supply of the aerosol generates a certain positive pressure in the area of the air and aerosol supply 4, i.e. the area in which the baked products to be cooled down are located. The positive pressure generated is about 10-20 Pa in the embodiment shown.

Sensors which capture the climatic surroundings of the baked products are located at a suitable spot near the baked products to be cooled down in the cooling tower 2. They capture the temperature, air pressure, and absolute humidity in the embodiment shown. The measured values captured with these sensors are compared to the predetermined setpoint values which should be present in the surroundings of the baked products to be cooled down in a specific area of the cooling tower 2. The setpoint values are values which define the cooling climate needed for setting the desired properties and quality features in the breads 3 to be cooled down. For example, the ambient pressure and relative humidity can be used to influence the moisture content of the cooling breads and thus their water activity. The setpoint pressure is used to prevent the breads 3 from releasing too much moisture while cooling down in the embodiment shown. When a difference between a captured measured value of one of the monitored climatic variables and the specified setpoint value is detected which exceeds a specific allowed tolerance value, the climate in the surroundings of the baked products to be cooled down is influenced accordingly. In such a case, there is a setpoint value shift that requires correction.

The climatic surroundings of the foods to be conditioned are influenced via the two actuators—air flow and aerosol load. Depending on the setpoint value shift and/or climatic variable to be corrected, the air flow is either controlled with respect to its flow rate (pressure change) and/or its temperature. Alternatively or in addition, the aerosol load can be influenced or changed. The aerosol load is primarily used to set the desired absolute water content for changing or maintaining the relative humidity.

The air follows the upward hot air flow which is due to convection and to the positive pressure set and flows upwards. The aerosol supply in this section of the cooling tower 2 is adjusted to the temperature of the breads 3 that is to be reduced in this section. The breads 3 are continuously conveyed through this zone of air and aerosol supply 4. For this purpose, the aerosol supply 4 is implemented in this embodiment shown by three aerosol supply segments, wherein the supplied amount of aerosol decreases from the top aerosol supply segment to the bottom aerosol supply segment in this section of the cooling tower 2. The aerosol supply amount is set up such that the breads 3 do not experience a weight loss while they are conveyed through this section, and instead experience a slight weight gain. In the embodiment shown, the aerosol supply amount is set such that the water saturation in the area of the breads 3 remains about constant, e.g. at about 80% relative humidity. The climate in the surroundings of the bread 3 is controlled by the process of comparing it to previously determined setpoint values as described above. In the embodiment shown, a mean treatment temperature at which the first aerosol treatment phase ends is reached when the breads 3 have cooled down to a surface temperature of the baked products of 65° C. Thus, the aerosol treatment phase ends inside the cooling tower 2 at a height at which the breads 3 only have a surface temperature of 65° C. In this embodiment, the mean product surface treatment temperature is 65° C. to have a safety factor because microbial recontamination of the breads 3 may occur at a temperature under 60° C.

To prevent recontamination of the breads 3, sterile air is supplied in the following second aerosol treatment phase. A second air and aerosol supply 5 is arranged in a second cooling section which follows the first cooling section in the cooling tower 2, and here, too, the air-borne aerosol is introduced peripherally with respect to the cooling section. While the aerosol supply in the aerosol treatment area of the first cooling section is set up during the first phase of an aerosol treatment such that the aerosol can diffuse into the core of the breads 3, the aerosol supply in the residual cooling down area and thus during the second aerosol treatment phase will primarily act on the surface of the breads. The biological additives supplied with the aerosol in this phase are also adapted to avoid or prevent recontamination. In this second aerosol treatment phase, the aerosol is introduced into the cooling section with sterile air. The pressure set by the air and aerosol supply in this second cooling section is about 10 Pa higher than the pressure set in the first cooling section. This measure effectively prevents an inflow of air from the first cooling section into the second cooling section. It also prevents non-sterile ambient air from entering the cooling tower 2 through an outlet through which the cooled down baked products are discharged from the cooling tower 2.

The residual cooling phase ends when the baked products have reached ambient temperature or have sufficiently cooled down to be subjected to further treatment. In the embodiment shown, the breads 3 are supplied in another treatment step after the cooling tower 2 to a cutting machine 6, where they are sliced before they are packaged.

The above description of the cooling device makes it clear that it is a continuous cooling device which is not sealed tightly from its surroundings.

Second Depicted Embodiment

This embodiment describes a defrosting facility 7.

In this facility, the food is subjected to a temperature change process which takes place in the opposite direction. The defrosting facility 7 of this embodiment (see FIG. 2) is designed as a continuous device. It includes a conveyor system 8 for transporting the unpackaged, deep-frozen foods to be defrosted after they were removed from a freezer room 9. The transport direction of the conveyor system 8 is indicated by an arrow in FIG. 1. The conveyor system 8 is sufficiently wide that multiple foods to be defrosted, which are blocks of fish 10 in the embodiment shown, can be placed next to each other. The defrosting facility 7 has a hood 11 under which the defrosting section is located. The hood 11 is used to protect the foods to be defrosted and for thermal or climatic insulation of the defrosting section from the ambient temperature. The space under the hood 11 represents the conditioning space in this embodiment. It will mostly be considerably higher than the temperature at which the deep-frozen foods (here, the blocks of fish 10) are to be defrosted. The hood 11 provides a defrosting chamber A1 which forms the conditioning space in this embodiment. Since the conveyor system 8 conveys the foods to be defrosted 10 through the defrosting chamber A1, the defrosting chamber A1 is designed as a defrosting tunnel.

The conveyor path on which the blocks of fish 10 are transported on the conveyor system 8 has a grid-like perforation for conducting an air flow therethrough. In addition, the perforation may drain any dripping water away from the foods to be defrosted. For this purpose, a drip pan not shown in the figures is provided under this conveyor path.

Multiple air outlet hoses 12, 12.1, 12.2, which in the embodiment shown are textile hoses, are located above the conveyor system 8 and inside the hood 11. The air outlet hoses 12, 12.1, 12.2 are each connected to a respective air supply 13, 13.1, 13.2 via which air is introduced into the air outlet hoses 12, 12.1, 12.2 and out of these into the defrosting chamber A1. The respective air supply 13, 13.1, 13.2 includes operating units such as a pump, filters, a temperature control device, and the like for this purpose, which units are not shown in FIG. 2. The amount of air supplied can also be set. A perforated aerosol outlet pipe 14, 14.1, 14.2 via which aerosol can be dispensed via an aerosol supply 15, 15.1, 15.2 is located next to each air outlet hose 12, 12.1, 12.2. The aerosol is generated, without necessarily increasing temperature, using an ultrasound aerosol generator in such a manner that the aerosol has a droplet size of about 0.001 to 0.005 mm or smaller. The respective aerosol outlet pipe 14, 14.1, 14.2 is arranged with respect to the respective adjacent air outlet hose 12, 12.1, 12.2 such that the air flow exiting the respective air outlet hose 12, 12.1, 12.2 picks up the aerosol droplets exiting the respective aerosol outlet pipe 14, 14.1, 14.2 and carries them along as a floating load. Each unit including an air outlet pipe 12, 12.1, 12.2 and an aerosol outlet pipe 14, 14.1, 14.2, respectively, is used to supply air and aerosol, wherein the respective supply can be controlled independently. These units will hereinafter be called air-aerosol supply units.

An exhaust ventilation 16 not shown in detail is located underneath the conveyor system. The exhaust ventilation 16 includes a collector arranged under the conveyor system 8 (shown in a side view in FIG. 2). The collector is designed to be associated with an extraction opening of each air-aerosol unit and is therefore located thereunder. The exhaust ventilation 16 can be operated actively to suction air and aerosol out of the defrosting chamber A1. This is meant to generate a directed aerosol-loaded air flow inside the defrosting chamber A1 from the air outlet hoses 12, 12.1, 12.2 to the conveyor system 8 with the blocks of fish 10 thereon and towards the exhaust ventilation 16. The conveyor system 8 is perforated to let the aerosol-loaded air flow through, such that the air flow also passes between blocks of fish 10. It is in principle sufficient to generate such an air flow passively, such that the air flow described above only flows via the air outlet hoses 12, 12.1, 12.2 into the defrosting chamber A1. The defrosting chamber then has one or multiple air outlets to achieve the desired air flow.

The air supply and the aerosol supply are used as actuators for setting the defrosting climate in the surroundings of the foods to be defrosted (here, the blocks of fish 10). Respective sensors are arranged in the conditioning space formed by the hood 11 for this purpose to capture the desired climatic data: temperature, air pressure, and absolute water content. A control unit compares these with specified set-point values which define the climate in the immediate surroundings of the blocks of fish 10 to be defrosted as a function of the progress of the defrosting process and thus as a function of the position of the blocks of fish 10 inside the defrosting tunnel. As described for the first embodiment, one or both actuators are controlled depending on the setpoint value shift to be corrected.

The blocks of fish 10 taken out of the freezer room 3 are unpacked and placed onto the conveyor system 8 for defrosting. The blocks of fish 10 then typically have a temperature of approx. −25° C. to −20° C. The blocks of fish 10 are then defrosted in an air flow borne aerosol environment in the defrosting facility 7 under the hood 11 in the defrosting chamber A1 defined by the same. The air supplied via air outlet hoses 12, 12.1, 12.2 is supplied in the embodiment shown at a temperature of +4° C. This is the desired defrosting temperature which will then prevail in the defrosting chamber A1. The air flow supplies the aerosol it carries to the blocks of fish 10, for which purpose the aerosol outlet pipes 14, 14.1, 14.2 are filled with aerosol. This measure reduces the time needed for defrosting due to the considerably better heat transfer compared to a defrosting environment without an aerosol load. At the same time, the moisture provided by the aerosol provides a defrosting climate which is virtually water-saturated when defrosting the blocks of fish 10 described here as an example, or, in other words: The high equilibrium moisture content prevents the foods to be defrosted from drying out. This also ensures that the thawing blocks of fish 10 do not significantly dry out in view of the product specifics. The aerosol-loaded air supply in interaction with the exhaust ventilation 16 is set such that a specific positive pressure is present in the area of the blocks of fish 10 conveyed on the conveyor system 8. Such a positive pressure is set to correspond about as far as possible to the vapor pressure that builds in the blocks of fish 10 during the defrosting process. The result of this measure is that the vapor pressure that builds in the food—here, a block of fish 10—does not or does not significantly escape, which largely or completely prevents a weight loss which would otherwise have to be accepted when defrosting deep-frozen foods.

The defrosted blocks of fish 10 leave the hood 11 at a core temperature of about ±0° C. to +4° C. The defrosted blocks of fish 10 are removed from the conveyor system 8 and supplied to further processing. The speed of travel of the blocks of fish 10 through the defrosting tunnel typically is between 4 and 8 hours.

In the two embodiments described above, the aerosol is generated using an ultrasound device. This saves energy. In addition, a precisely defined droplet size can be set within a narrow size spectrum. It is particularly advantageous that no higher temperature is needed for aerosol generation, such that the aerosol can also be used as a carrier of antimicrobial and/or antifungal substances.

The two embodiments described above illustrate that a suitable climate can be set up inside a conditioning space in a particularly simple and energy-saving manner for increasing product quality at a temperature change using just two actuators—an air flow and an aerosol supply.

The required sensing and control equipment of the methods described is not shown in the figures for the sake of clarity; also omitted is the fact that these are connected to an electronic control unit which influences the actuators.

The description based on the depicted embodiments makes it clear that a method according to the present disclosure allows setting up the climate in the immediate surroundings of foods in a particularly simple and effective manner as may be required. The air flow provided for conditioning also contributes to a change of air in the conditioning space. Such a method can also be used for humidifying and dehumidifying if the setpoint values are specified accordingly.

The method described can also be used to clean the conditioning space, using the same measures in the conditioning space, for example by adding respective substances to the aerosol, for example to sterilize the conditioning space and its walls, for example during interruptions of food treatment, food processing, and/or food production.

It is a particular advantage, as described in reference to the depicted embodiments, that climatic conditioning can also be used in open conditioning spaces and therefore in a continuous food treatment process, food processing process, and/or food production process. This means that the climate in the conditioning space can be kept constant. This method differs from conventional methods in this respect, where conditioning was performed in closed spaces and in batches. Introducing and removing a food into and from such a conditioning space results in significant climatic changes in the conditioning space. Hygienic problems are the consequence.

This method can also be used in conjunction with storing foods or raw materials for foods.

Although the invention has been described based on some example embodiments, a person skilled in the art can find numerous other ways to implement or use the method within the scope of the applicable claims.

While a number of aspects and embodiments have been discussed above, those of skill in the art will recognize certain modifications, permutations, additions and sub-combinations therefor. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general, the terms and phrases used herein have their art-recognized meaning, which can be found by reference to standard texts, journal references and contexts known to those skilled in the art. The above definitions are provided to clarify their specific use in the context of the invention.

LIST OF REFERENCE SYMBOLS

1 Continuous oven
2 Cooling tower
3 Bread
4 Air and aerosol supply
5 Air and aerosol supply
6 Cutting machine
7 Defrosting facility
8 Conveyor system
9 Freezer room
10 Block of fish
11 Hood
12, 12.1, 12.2 Air outlet hose
13, 13.1, 13.2 Air supply
14, 14.1, 14.2 Aerosol outlet pipe
15, 15.1, 15.2 Aerosol supply
16 Exhaust ventilation
$A_1$ Defrosting chamber

The invention claimed is:

1. A method for conditioning a food in connection with a treatment, processing, or production of the food in an air environment in a conditioning space, through which the food is conveyed, comprising:

a) capturing climatic data within the conditioning space for conditioning variables, which affect the food in a conditioning process, during the conditioning process in surroundings of the food within the conditioning space, wherein the conditioning variables comprise temperature, absolute water content, and air pressure, and further comprise $CO_2$ content and/or $O_2$ content, and wherein each of the conditioning variables are captured as measured values, and wherein the conditioning space is an open conditioning space;

b) comparing the measured values of the conditioning variables with respective setpoint values for the conditioning variables during the conditioning process, wherein the setpoint values comprise a setpoint temperature, a setpoint absolute water content, and a setpoint pressure, as well as a setpoint $CO_2$ content and/or a setpoint $O_2$ content, and wherein the setpoint values are predetermined for the conditioning process of the food; and c) if a deviation of the measured value of one or more of the conditioning variables from the setpoint value associated therewith is detected, regulating the surroundings of the food in the conditioning space in order to adjust the measured value to the setpoint value, whereby an air flow is applied to the food in the conditioning space, and whereby:

(i) if the deviation is with respect to the measured temperature, the measured temperature is adjusted to the setpoint temperature by regulating the amount of the air flow supplied as inflow and/or the temperature of the air flow, (ii) if the deviation is with respect to the measured pressure, the measured pressure is adjusted to the setpoint pressure by regulating the amount of the air flow supplied as inflow, (iii) if the deviation is with respect to the measured absolute water content, the measured absolute water content is adjusted to the setpoint absolute water content by regulating a corresponding water-aerosol load of the air flow in which aerosol droplets are carried along as a floating load, and wherein the aerosol droplets are generated without a heat source, and (iv) if the deviation is with respect to the measured $CO_2$ content and/or the measured $O_2$ content, the measured $CO_2$ content is adjusted to the setpoint $CO_2$ content and/or the measured $O_2$ content is adjusted to the setpoint $O_2$ content, respectively, by increasing the amount of the air flow supplied as inflow from outside the conditioning space and/or by establishing a fluid connection between the conditioning space and an outside environment of a building in which the conditioning space is located;

wherein air and humidity exiting from the conditioning space are compensated by the inflow of the air flow and climatic control of the surroundings of the food.

2. The method of claim 1, wherein at least the setpoint absolute water content is determined based on a water activity of the food.

3. The method of claim 1, wherein conditioning of the food is performed in multiple steps, wherein said steps differ with respect to the measured temperature of the food and at least one other measured conditioning variable.

4. The method of claim 1, wherein antimicrobial and/or antifungal substances are added to the food with the water-aerosol load.

5. The method of claim 1, wherein climatic data are captured outside the conditioning space for one or more climatic variables, wherein at least one of the climatic variables: temperature, absolute water content, or pressure is captured as a measured external value, which is compared to the respective setpoint value and to the difference of the setpoint value and the measured value captured inside the conditioning space, and wherein if a deviation between the external measured value captured outside the conditioning space and the setpoint value is detected, the conditioning process is adjusted depending on a reaction inertia that determines if and to what extent a change of the external measured value results in a change of the measured value inside the conditioning space.

6. The method according of claim 1, wherein the climatic data captured outside the conditioning space are climatic data of the outside environment of the building in which the conditioning space is located.

7. The method of claim 5, wherein in adjusting the conditioning process, climatic predictions are considered in addition to the measured external value(s) obtained outside the conditioning space.

8. The method of claim 1, wherein the method is performed in conjunction with cooling down baked products after removal from an oven.

9. The method of claim 1, wherein the method is performed in conjunction with defrosting deep-frozen foods.

* * * * *